(12) United States Patent
Kim et al.

(10) Patent No.: US 9,222,801 B2
(45) Date of Patent: Dec. 29, 2015

(54) APPARATUS AND METHOD FOR CORRECTING ERROR OF GYRO SENSOR IN MOBILE ROBOT

(75) Inventors: Do-Hyung Kim, Seoul (KR); Hak-Young Chung, Seoul (KR); Jin-Woo Song, Seoul (KR); Guen-Rok Ryu, Gyeonggi-do (KR)

(73) Assignee: MICROINFINITY, INC., Gyeonggi-Do (KR)

( * ) Notice: Subject to any disclaimer, the term of this patent is extended or adjusted under 35 U.S.C. 154(b) by 1212 days.

(21) Appl. No.: 13/002,331

(22) PCT Filed: Jun. 26, 2009

(86) PCT No.: PCT/KR2009/003486
§ 371 (c)(1),
(2), (4) Date: Apr. 1, 2011

(87) PCT Pub. No.: WO2010/002152
PCT Pub. Date: Jan. 7, 2010

(65) Prior Publication Data
US 2011/0172820 A1    Jul. 14, 2011

(30) Foreign Application Priority Data
Jul. 1, 2008 (KR) .................. 10-2008-0063541

(51) Int. Cl.
*G01C 25/00* (2006.01)
*G01C 19/5776* (2012.01)
*G05D 1/02* (2006.01)

(52) U.S. Cl.
CPC .......... *G01C 25/005* (2013.01); *G01C 19/5776* (2013.01); *G05D 1/027* (2013.01); *G05D 2201/0203* (2013.01)

(58) Field of Classification Search
USPC ....................................................... 73/1.77
See application file for complete search history.

(56) References Cited

U.S. PATENT DOCUMENTS

| | | | | |
|---|---|---|---|---|
| 5,570,304 A | * | 10/1996 | Mark et al. | 703/7 |
| 5,650,703 A | * | 7/1997 | Yardley et al. | 318/587 |
| 6,332,103 B1 | * | 12/2001 | Steenson et al. | 701/1 |
| 6,377,906 B1 | * | 4/2002 | Rowe | 702/151 |
| 6,577,976 B1 | * | 6/2003 | Hoff et al. | 702/95 |
| 7,103,477 B1 | * | 9/2006 | Lee | 701/505 |
| 7,337,040 B2 | * | 2/2008 | Takenaka et al. | 700/245 |
| 7,801,694 B1 | * | 9/2010 | Watson | 702/104 |
| 2004/0064252 A1 | * | 4/2004 | Kirkland et al. | 701/220 |
| 2005/0056461 A1 | * | 3/2005 | Estes et al. | 175/45 |
| 2006/0037417 A1 | * | 2/2006 | Shcheglov et al. | 74/5.4 |
| 2006/0076917 A1 | | 4/2006 | Lim et al. | |
| 2007/0152618 A1 | | 7/2007 | Saotome et al. | |

(Continued)

FOREIGN PATENT DOCUMENTS

| | | | |
|---|---|---|---|
| KR | 100486505 B1 | 4/2005 |
| KR | 100772915 B1 | 11/2007 |

OTHER PUBLICATIONS

International Search Report and Written Opinion, mailed Feb. 17, 2010, in corresponding International Patent Application No. PCT/KR2009/003486, 18 pgs.

*Primary Examiner* — Bao Long T Nguyen
(74) *Attorney, Agent, or Firm* — Perkins Coie LLP (57) ABSTRACT

Provided are a method and apparatus for correcting an error of a gyro sensor, and more particularly, a method and apparatus for correcting an error of a gyro sensor installed in a mobile robot.

8 Claims, 6 Drawing Sheets

(56) References Cited

U.S. PATENT DOCUMENTS

2008/0022790 A1* 1/2008 Lee et al. .................... 74/5.4
2008/0249732 A1* 10/2008 Lee et al. .................... 702/96
2009/0093984 A1* 4/2009 Choi et al. .................. 702/104
2010/0063763 A1* 3/2010 Rozelle ........................ 702/92
2010/0121601 A1* 5/2010 Eckert ........................ 702/104

* cited by examiner

APPARATUS AND METHOD FOR CORRECTING ERROR OF GYRO SENSOR IN MOBILE ROBOT

RELATED APPLICATION

The subject application is a U.S. National Stage application of International Application No. PCT/KR2009/03486, filed on 26 Jun. 2009, which claims the priority of Korean Patent Application No. 10-2008-0063541, filed on 1 Jul. 2008, the contents of which are herein incorporated by reference in its entirety.

TECHNICAL FIELD

The present invention relates to an apparatus and method for correcting an error of a gyro sensor, and more particularly, to an apparatus and method for correcting an error of a gyro sensor installed in a mobile robot.

BACKGROUND ART

Robots are being used not only in industries but also increasingly in homes, offices, and the like to assist in chores. Representative examples of such robots used in homes and offices include cleaning robots, guide robots, and security robots. These robots typically carry out their unique functions while moving in a given space.

A mobile robot may include an attitude sensor sensing the attitude of the mobile robot. Here, the 'attitude' denotes the position and direction angle of the mobile robot. For example, the attitude of a mobile robot moving on a flat surface may be the two-dimensional position and direction angle of the mobile robot. To estimate the attitude of such a mobile robot, a gyro sensor, an acceleration sensor, and an encoder may be used.

A gyro sensor is a sensor sensing the angular velocity of an object. It measures the rotational angular velocity of an object or a navigating object and may also be referred to as a gyroscope. Gyro sensors can be applied in, for example, handshake compensation devices of camcorders, three-dimensional mouses, attitude controllers of remote control (RC) helicopters, electronic stability program (ESP) of vehicles, and inertial navigation systems of airplanes.

Conventional gyro sensors are used in high-precision navigation systems such as airplanes and offensive or defensive devices with related to weapons. Since these conventional gyro sensors are used in high-precision navigating systems, their various types of errors are not such a problem.

However, low-priced gyro sensors manufactured using micro-electro-mechanical system (MEMS) technology have relatively lower performance than conventional high-priced gyro sensors. Therefore, the performance of gyro sensors manufactured using the MEMS technology needs to be improved.

Figure 1:
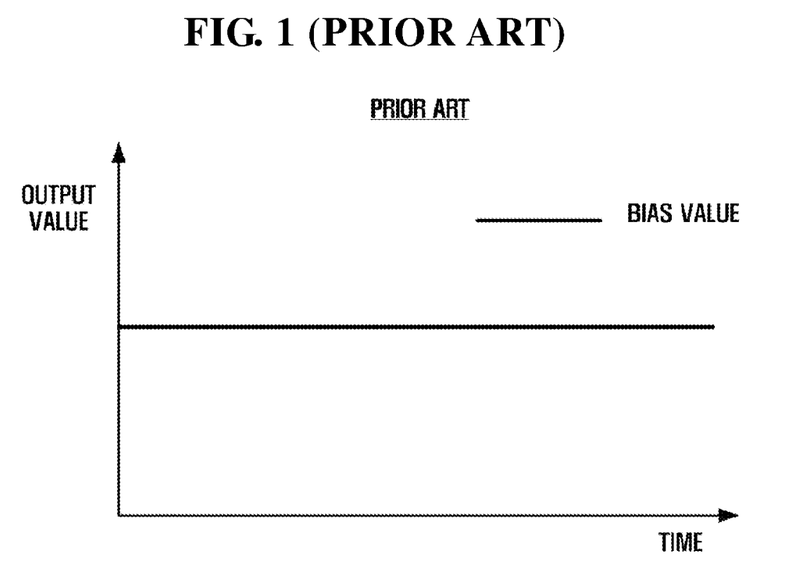
FIG. 1 is a diagram illustrating theoretical values output from a conventional gyro sensor when a mobile apparatus equipped with the gyro sensor is stationary.

FIG. 1 is a diagram illustrating theoretical values output from a conventional gyro sensor when a mobile apparatus equipped with the gyro sensor is stationary. Referring to FIG. 1, the gyro sensor is a sensor measuring the rotational angular velocity of an object. Thus, when the mobile apparatus (e.g., a cleaning mobile robot) equipped with the gyro sensor is not rotating, the gyro sensor outputs a constant value since the rotational angular velocity of the mobile apparatus is zero. This constant output value is referred to as a 'bias value.'

Figure 2:
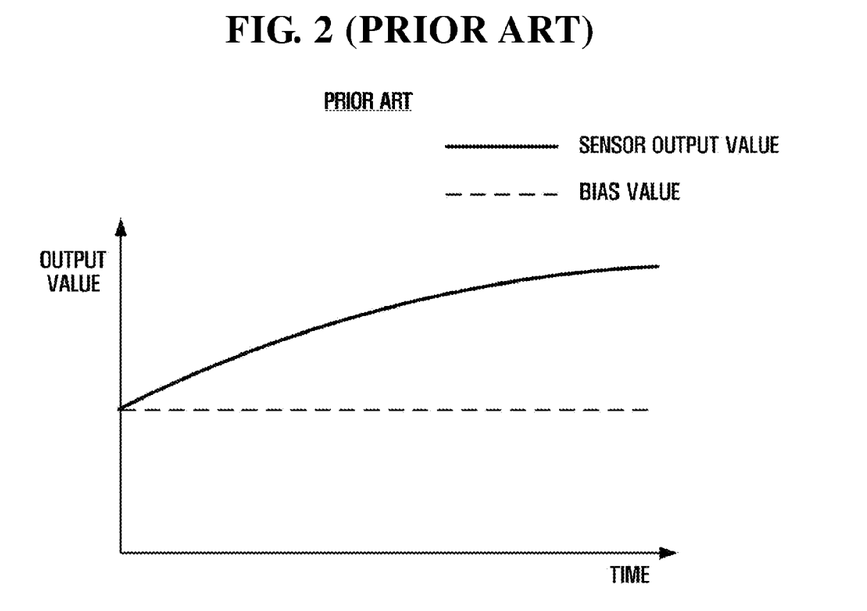
FIG. 2 is a diagram illustrating an output value of a conventional gyro sensor over time when a mobile apparatus equipped with the gyro sensor is rotating.

FIG. 2 is a diagram illustrating an output value of a conventional gyro sensor over time when a mobile apparatus equipped with the gyro sensor is rotating. Referring to FIG. 2, when the mobile apparatus is rotating, its angular velocity is not zero. Therefore, the rotational angular velocity of the mobile apparatus may be measured by subtracting a bias value from an output value of the gyro sensor.

Since the rotational angular velocity of a mobile apparatus is sensed based on a bias value and an output value of a gyro sensor, the bias value needs to be estimated relatively accurately. In addition, a method and apparatus for correcting, in real time, a bias value using output values of a gyro sensor are required to relatively accurately estimate the attitude of a mobile robot equipped with the gyro sensor.

DETAILED DESCRIPTION OF THE INVENTION

Technical Goal of the Invention

The present invention provides a method and apparatus for correcting an error of a gyro sensor in a mobile robot while the mobile robot is moving.

The present invention also provides a mobile robot which can correct an output value of a gyro sensor in real time.

The present invention also provides a method and apparatus for estimating a rotational angle of a mobile robot relatively accurately by correcting a bias value of a gyro sensor while the mobile robot is moving.

However, the objectives of the present invention are not restricted to the one set forth herein. The above and other objectives of the present invention will become more apparent to one of ordinary skill in the art to which the present invention pertains by referencing the detailed description of the present invention given below.

Disclosure of the Invention

According to an aspect of the present invention, there is provided an apparatus for correcting an error of a gyro sensor in a mobile robot. The apparatus includes: a control unit stopping or moving the mobile robot; and a correction unit determining whether the mobile robot is stationary and correcting an error of the gyro sensor using output values obtained from the gyro sensor when the mobile robot is stationary, wherein the correction unit includes: a state determination unit determining whether the mobile robot is stationary using a deviation of output values of the gyro sensor; and a bias calculation unit calculating a bias value using output values of the gyro sensor when it is determined that the mobile robot is stationary.

According to another aspect of the present invention, there is provided a mobile robot estimating a rotation angle thereof. The mobile robot includes: a state determination unit determining whether the mobile robot is stationary; a bias calculation unit calculating a bias value using output values of a gyro sensor installed in the mobile robot when the state determination unit determines that the mobile robot is stationary; and a rotation angle estimation unit estimating the rotation angle of the mobile robot using the calculated bias value and output values of the gyro sensor when the mobile robot is moving.

According to another aspect of the present invention, there is provided a method of correcting an error of a gyro sensor in a mobile robot. The method includes: determining whether the mobile robot is stationary using a deviation of output values of the gyro sensor installed in the mobile robot; calculating a bias value using output values of the gyro sensor when it is determined that the mobile robot is stationary; and calculating an angular velocity of the mobile robot using an output value of the gyro sensor and the calculated bias value when the mobile robot is moving.

Effect of the Invention

According to an exemplary embodiment of the present invention, the performance of a gyro sensor installed in a mobile robot can be enhanced by updating a bias value while the mobile robot is moving.

In addition, an error in estimating a directional angle of the mobile robot can be reduced by correcting an error of the gyro sensor in real time while the mobile robot is moving.

Furthermore, an error of the gyro sensor can be corrected by determining whether the mobile robot is stationary even without receiving a stop signal from an external source.

However, the effects of the present invention are not restricted to the one set forth herein. The above and other effects of the present invention will become more apparent to one of daily skill in the art to which the present invention pertains by referencing the claims.

BRIEF DESCRIPTION OF THE DRAWINGS

The above and other features and advantages of the present invention will become more apparent by describing in detail preferred embodiments thereof with reference to the attached drawings in which.

BEST MODE FOR CARRYING OUT THE INVENTION

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

Hereinafter, an apparatus and method for correcting an error of a gyro sensor in a mobile robot according to exemplary embodiments of the present invention will be described with reference to block diagrams or flowchart illustrations. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

The term 'unit', as used herein, means, but is not limited to, a software or hardware component, such as a Field Programmable Gate Array (FPGA) or Application Specific Integrated Circuit (ASIC), which performs certain tasks. A unit may advantageously be configured to reside on the addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units.

Hereinafter, exemplary embodiments of the present invention will be described in further detail with reference to the attached drawings.

Figure 3:
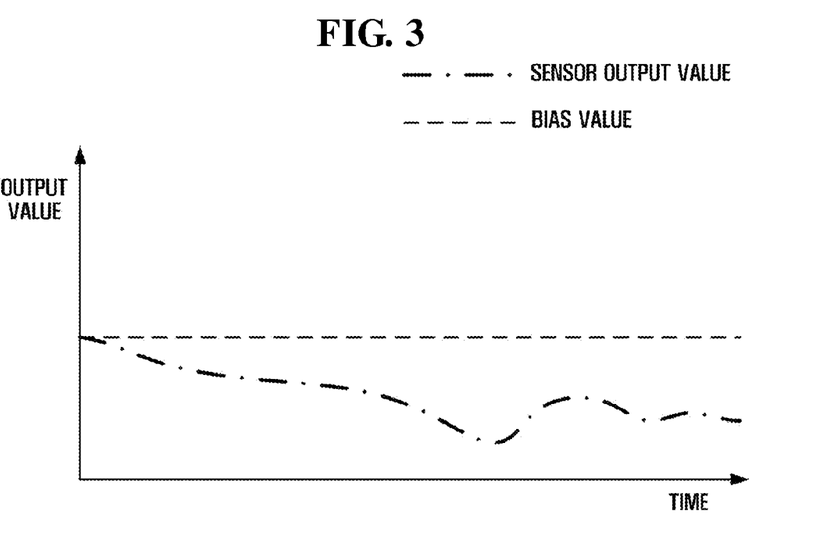
FIG. 3 is a diagram illustrating values output from a gyro sensor of a mobile apparatus in a stationary state.

FIG. 3 is a diagram illustrating values output from a gyro sensor of a mobile apparatus in a stationary state. Referring to FIG. 3, a bias value of the gyro sensor varies over time. In theory, the gyro sensor of the mobile apparatus in a stationary state should have a constant bias value over time. However, the bias value may vary over time due to, for example, changes in operational temperature, a sudden supply of power, changes in the resistance value of the gyro sensor, and the like.

When a value output from the gyro sensor deviates from an initially determined bias value as shown in FIG. 3, it may be determined that the mobile apparatus has a certain angular velocity, and thus a rotation angle of the mobile apparatus may be measured to be increasing or decreasing over time. However, even when the mobile apparatus is stationary, it may be erroneously determined that the mobile apparatus is rotating, and thus the rotation angle of the mobile apparatus may be measured to be increasing or decreasing over time. In an exemplary embodiment of the present invention, such mistakes and/or errors are referred to as "gyro sensor errors."

Therefore, a method of accurately estimating a bias value that varies in real time is required. It is not easy for the gyro sensor to distinguish whether its output value results from the rotation of the mobile apparatus or from its error. Since the gyro sensor measures the angular velocity of the mobile apparatus using its output value that deviates from the bias value, whether an output value of the gyro sensor results from the rotation of the mobile apparatus or from a gyro sensor error can be determined if it can be distinguished whether the mobile apparatus is stationary.

Figure 4:
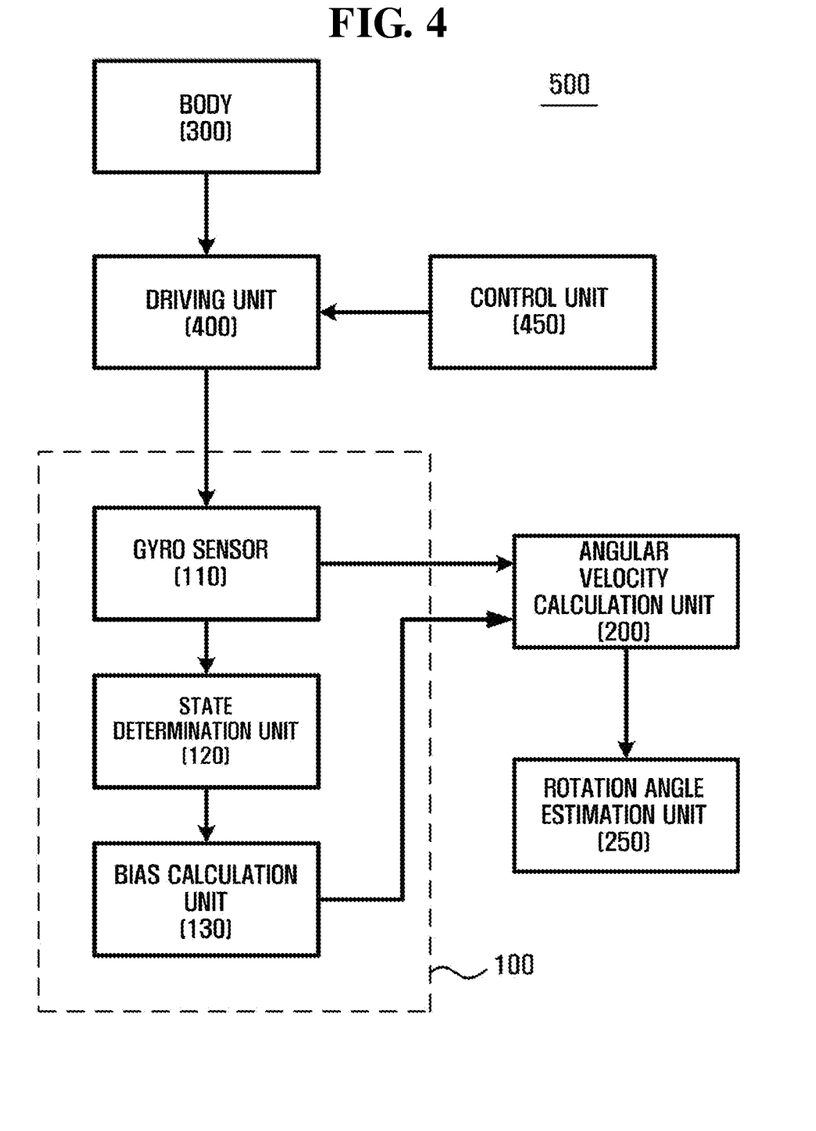
FIG. 4 is a block diagram of a mobile robot including an apparatus for correcting an error of a gyro sensor according to an exemplary embodiment of the present invention.

FIG. 4 is a block diagram of a mobile robot 500 including an apparatus for correcting a gyro sensor error according to an exemplary embodiment of the present invention.

Referring to FIG. 4, the mobile robot 500 including the apparatus for correcting a gyro sensor error according to the current exemplary embodiment may include a body 300, a driving unit 400, a control unit 450, a correction unit 100, an angular velocity calculation unit 200, and a rotation angle estimation unit 250. The correction unit 100 may include a gyro sensor 110, a state determination unit 120, and a bias calculation unit 130.

The body 300 provides a space in which the driving unit 120 driving the mobile robot 500 and the control unit 450 controlling the movement of the mobile robot 500 can be loaded. In addition, the body 300 may include various components providing various functions of the mobile robot 500.

The driving unit 400 may include a driving motor providing a driving force, a caterpillar or wheels of a predetermined diameter driven by the driving motor, and a driving control circuit controlling the driving. While moving, the mobile robot 500 may use right and left wheels driven by the driving unit and manual wheels installed in a front part or in both front and rear parts thereof.

The control unit 450 may control the movement of the mobile robot 500 and/or the operation of the mobile robot 500. For example, the control unit 450 may adjust the trajectory of the mobile robot 500 or modify the trajectory of the mobile robot 500 by sensing obstacles around the mobile robot 500. Also, the control unit 450 may change the movement pattern of the mobile robot 500. For example, the control unit 450 may control the mobile robot 500 to stop temporarily at predetermined time intervals, to stop temporarily after travelling a predetermined distance, or to start moving after stopping for a predetermined period of time at every predetermined time.

The correction unit 100 corrects an output value of the gyro sensor 110 attached to the mobile robot 500. The correction unit 100 may correct a gyro sensor error from out values of the gyro sensor 110.

As mentioned above, the correction unit 100 may include the gyro sensor 110, the state determination unit 120, and the bias calculation unit 130. The gyro sensor 110 is a sensor sensing the angular velocity of an object. It measures the rotational angular velocity of an object or a navigating object. The gyro sensor 110 is installed in the body 300 of the mobile robot 500 and measures the rotational angular velocity of the mobile robot 500 in three directions perpendicular to one another.

The state determination unit 120 determines whether the mobile robot 500 is stationary using output values of the gyro sensor 110. Specifically, the state determination unit 120 may determine whether the mobile robot 500 is stationary based on a relative deviation of output values of the gyro sensor 110. Here, the relative deviation refers to a deviation, e.g., standard deviation or variance, of output values of a gyro sensor. The relative deviation may also refer to a relative amount of variation from the mean or a predetermined value in the output values of the gyro sensor.

The bias calculation unit 130 calculates a bias value using output values of the gyro sensor 110. Here, the 'bias value' may refer to a basic value output from the gyro sensor 110 when the mobile robot 500 is not rotating. Thus, when the mobile robot 500 is not rotating, the bias value should be, in theory, zero degrees/second. However, if 7 degrees/second, for example, is sensed by and output from the gyro sensor 110 as the rotational angular velocity of the mobile robot 500 or if a voltage value corresponding to this rotational angular velocity is measured by and output from the gyro sensor 110, the bias value may become 7 degrees/second. That is, the bias value is an offset value, i.e., the bias value is sensed to have a predetermined value even when a moving object or a body actually is not rotating. The bias value is not fixed but variable over time.

When the state determination unit 120 determines whether the mobile robot 500 is stationary, the bias calculation unit 130 calculates a bias value based on the determination result of the state determination unit 120. For example, when the state determination unit 120 determines that the mobile robot 500 is stationary, the bias calculation unit 130 calculates a bias value using output values of the gyro sensor 110 which are obtained while the mobile robot 500 is stationary.

When the state determination unit 120 determines that the mobile robot 500 is stationary, the bias calculation unit 130 may indicate the stationary state of the mobile robot 500 by, for example, displaying the angular velocity of the mobile robot 500 as '0 degrees per second' on a display unit or dashboard of the mobile robot 500. Alternatively, the bias calculation unit 130 may provide a sign or signal indicating the stationary state of the mobile robot 500 to a remote control controlling the mobile robot 500.

The angular velocity calculation unit 200 calculates the angular velocity of the mobile robot 500 using an output value of the gyro sensor 110. When calculating the angular velocity of the mobile robot 500 using an output value of the gyro sensor 110, the angular velocity calculation unit 200 may use a bias value calculated by the bias calculation unit 130. For example, when an output value of the gyro sensor 110 is '30 degrees/second' and when a bias value is '7 degrees/second,' the angular velocity calculation unit 200 may calculate that the angular velocity of the mobile robot 500 is '23 degrees/second' by subtracting the bias value from the output value of the gyro sensor 110.

The rotation angle estimation unit 250 estimates a rotation angle by integrating calculated angular velocities. For example, when the mobile robot 500 moves on a flat surface, an estimated rotation angle of the mobile robot 500 may have the same direction in which the mobile robot 500 moves.

As described above, in an exemplary embodiment of the present invention, errors of a gyro sensor installed in a mobile robot can be reduced by updating and correcting, in real time, a bias value that may vary over time. In addition, since the correction of the bias value is made based on whether the mobile robot is stationary, gyro sensor errors which may occur due to changes in the bias value can be reduced. This reduction of gyro sensor errors enables the rotation angle of the mobile robot equipped with the gyro sensor to be estimated relatively accurately.

Figure 5:
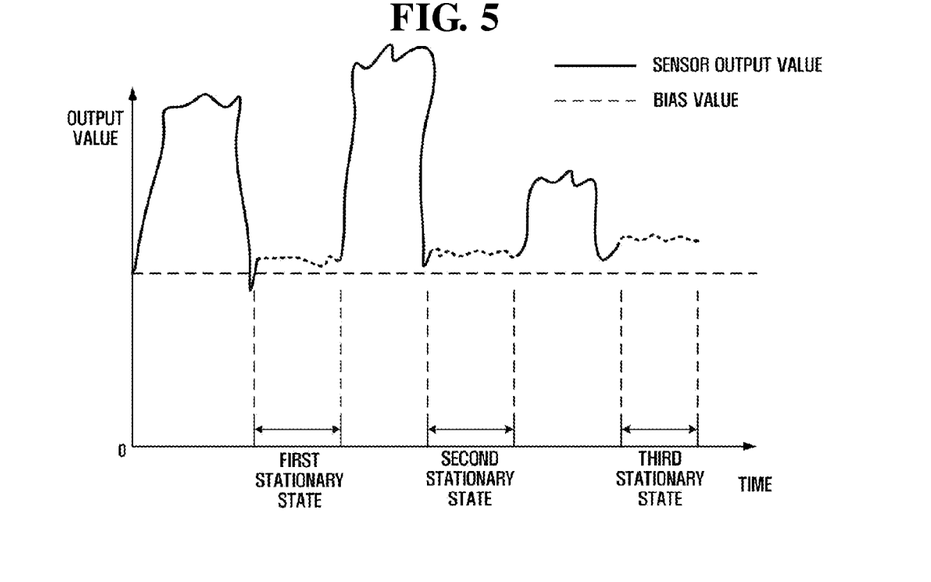
FIG. 5 is a diagram illustrating values output from a gyro sensor of a mobile robot while the mobile robot is moving, according to an exemplary embodiment of the present invention.

FIG. 5 is a diagram illustrating values output from a gyro sensor of a mobile robot while the mobile robot is moving, according to an exemplary embodiment of the present invention. Referring to FIG. 5, as the mobile robot moves, an output value of the gyro sensor varies in real time. The gyro sensor outputs a relatively high value in a region in which the mobile robot changes its direction of movement. On the other hand, when the mobile robot is stationary (e.g., in a first stationary state, a second stationary state, and a third stationary state), the gyro sensor outputs a noticeably and relatively low value which varies relatively little over time.

Therefore, in an exemplary embodiment of the present invention, whether the mobile robot is stationary can be determined by reflecting these output characteristics of the gyro sensor. In theory, when the mobile robot is stationary, the output value of the gyro sensor should have an initially determined bias value. However, the output value of the gyro sensor may have a bias value which is different from the initial bias value due to an error of the gyro sensor itself. A bias value is not a fixed value but is a value that varies according to various factors. In an exemplary embodiment of the present invention, a bias value may be understood as a value that varies over time.

As illustrated in FIG. 5, when the mobile robot is stationary, the output value of the gyro sensor varies within a certain range, that is, the deviation of output values of the gyro sensor is smaller than when the mobile robot is moving. Therefore, in an exemplary embodiment of the present invention, whether the mobile robot is stationary can be determined based on the deviation of output values of the gyro sensor. Specifically, output values of the gyro sensor may be sampled for a predetermined period of time, and the standard deviation or variance of n sampled output values may be calculated. When the calculated standard deviation or variance is equal to or less than a threshold, it may be determined that the mobile robot is stationary. Here, the threshold may be determined experimentally or based on a theoretical analysis by using the deviation of output values of the gyro sensor which are obtained while a moving object equipped with the gyro sensor is stationary.

As described above, the gyro sensor itself cannot determine whether the mobile robot is stationary or moving. However, according to an exemplary embodiment of the present invention, whether the mobile robot is stationary can be determined by analyzing output values of the gyro sensor. If it can be determined whether the mobile robot is stationary, a 'bias value' can be easily extracted since a value output from the gyro sensor when the mobile robot is stationary can be considered as an offset value.

A bias value may be calculated by calculating a representative value for values output from the gyro sensor while the mobile robot is determined to be stationary. Then, the calculated bias value may be continuously updated using values output from the gyro sensor while the mobile robot is stopped periodically or non-periodically. Therefore, the bias value may be updated to a representative value calculated when the mobile robot is stationary, and, when the mobile robot moves, the rotational angular velocity of the mobile robot may be calculated using an output value of the gyro sensor and the updated bias value.

Various techniques can be employed to calculate a representative value for output values obtained from the gyro sensor while the mobile robot is stationary. For example, the mean or weighted mean of data whose standard deviation is equal to or less than a threshold can be calculated as a representative value.

A bias value can be calculated by calculating the mean in real time. Since an output value of the gyro sensor continuously changes over time even when the mobile robot is stationary, a representative value may also change continuously. Thus, the representative value can be continuously updated using the following equation.

$$E[k+1] = \frac{k \times E[k]}{k+1} + \frac{v_{k+1}}{k+1}. \quad (1)$$

Where $E[k+1]$ is a representative value in a time section $(k+1)$, $k$ is an index indicating a unit of time, and $v_{k+1}$ is an output value of a gyro sensor in the time section $(k+1)$.

If the time section $(k+1)$ is a current time section, a representative value for output values of the gyro sensor in the current time section may be calculated using a representative value of a previous time section (i.e., the time section k) and an output value of the gyro sensor in the current time section. Since an output value obtained from the gyro sensor when the mobile robot is determined to be stationary continuously changes over time, a bias value can be calculated by reflecting the changing output value in real time.

If a representative value is calculated by reflecting, in real time, a bias value obtained when the mobile robot is stationary, a memory for storing data may be reduced or may not be required. For example, if a representative value is calculated as the mean of ten pieces of data, ten pieces of data should be stored, and the mean of the ten pieces of data should be calculated. However, if the mean is calculated in real time by using Equation (1), a representative value in the current time section can be calculated using only two values, that is, an output value of the gyro sensor in the current time section (e.g., the time section $(k+1)$) and a representative value of the previous time section (e.g., the time section k). This real-time mean calculation technique can be efficiently used in an embedded system having a small memory.

Figure 6:
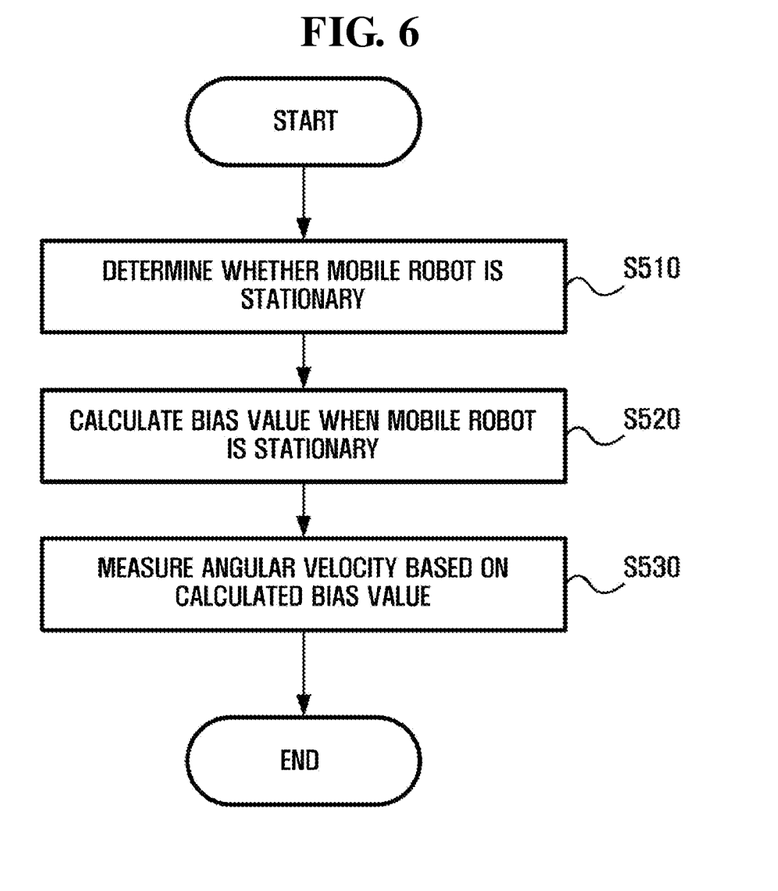
FIG. 6 is a flowchart illustrating a method of correcting an error of a gyro sensor in a mobile robot according to an exemplary embodiment of the present invention.

FIG. 6 is a flowchart illustrating a method of correcting an error of a gyro sensor in a mobile robot according to an exemplary embodiment of the present invention. Referring to FIG. 6, the gyro sensor 110 determines whether the mobile robot 500 is stationary (operation S510). Whether the mobile robot 500 is stationary can be determined based on the deviation of output values of the gyro sensor 110. When the deviation of the output values of the gyro sensor 110 is equal to or less than a threshold, it is determined that the mobile robot 500 is stationary. Here, the threshold may be determined experimentally and/or theoretically since it can vary according to the environment in which the gyro sensor 110 operates and environmental factors of the mobile robot 500.

When it is determined that the mobile robot 500 is stationary, a bias value is calculated (operation S520). The bias value is a representative value for values output from the gyro sensor 110 when the mobile robot 500 is stationary. By accurately estimating the bias value when the mobile robot 500 is stationary, gyro sensor errors that may occur while the mobile robot 500 is moving can be reduced. Since the bias value can vary over time, the representative value can be calculated by continuously collecting output values of the gyro sensor 110 as in Equation (1). Alternatively, the representative value can be calculated using various statistical techniques, for example, by calculating the mean or weighted mean of output values obtained from the gyro sensor 110 in a time period in which the deviation of output values is determined to be equal to or less than a threshold.

Once the bias value is calculated, the angular velocity of the mobile robot 5000 is measured using the calculated bias value and an output value of the gyro sensor 110. For example, when the deviation of output values of the gyro sensor 110 exceeds a threshold, it may be determined that the mobile robot 500 is not stationary. In this case, the angular velocity of the mobile robot 500 may be measured by subtracting the bias value from each output value of the gyro sensor 110. Finally, the rotation angle of the mobile robot 500 may be calculated by integrating the measured angular velocities of the mobile robot 500.

As described above, it is determined whether a mobile robot is temporarily stationary, and a bias value is calculated using values output from a gyro sensor when the mobile robot is stationary. Thus, the angular velocity of the mobile robot can be estimated relatively accurately. In addition, since the mobile robot temporarily stops periodically or non-periodically, the bias value can be updated continuously. Accordingly, an error in estimating the rotation angle of the mobile robot can be reduced by reflecting the bias value that varies over time.

Figure 7:
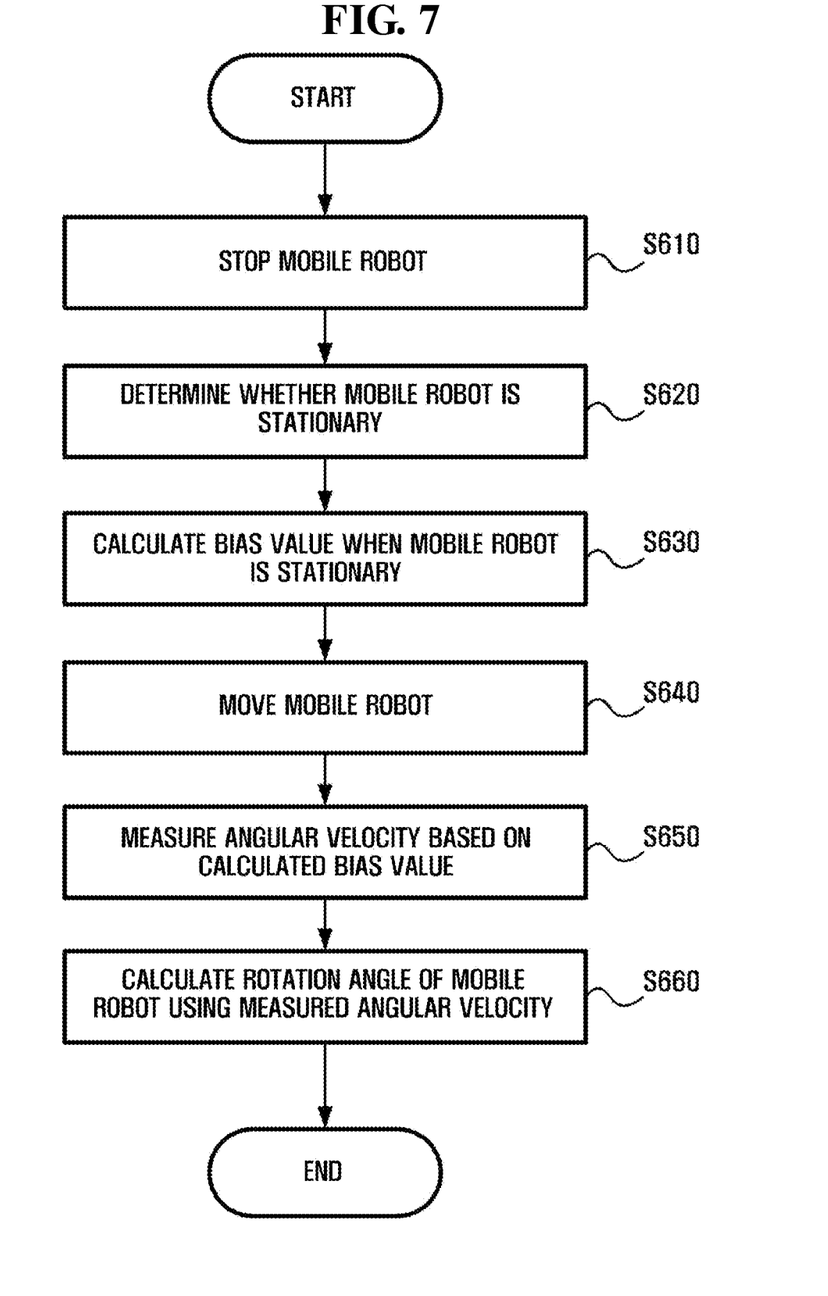
FIG. 7 is a flowchart illustrating a method of correcting an error of a gyro sensor in a mobile robot according to another exemplary embodiment of the present invention.

FIG. 7 is a flowchart illustrating a method of correcting an error of a gyro sensor in a mobile robot according to another exemplary embodiment of the present invention. Referring to FIG. 7, the control unit 450 of the mobile robot 500 controls the driving unit 400 to stop the mobile robot 500 (operation S610). The mobile robot 500 may be temporarily stopped periodically or non-periodically.

It is determined whether the mobile robot 500 is stationary using the deviation of output values of the gyro sensor 110 installed in the mobile robot 500 (operation S620). When it is determined that the mobile robot 500 is stationary, a bias value is calculated using output values of the gyro sensor 110 (operation S620). The bias value may be calculated as a representative value for values output from the gyro sensor 110 when the mobile robot 500 is stationary.

The control unit 450 automatically starts moving the mobile robot 500 upon a lapse of a predetermined period of time after temporarily stopping the mobile robot 500 (operation S640). As the mobile robot 500 moves, output values of the gyro sensor 110 are continuously obtained, and the angular velocity of the mobile robot 500 is measured in real time using each output value and the calculated bias value (operation S650). Then, the rotation angle of the mobile robot 500 is calculated by integrating the measured angular velocities (operation S660).

As described above, according to an exemplary embodiment of the present invention, a bias value is updated by temporarily stopping the movement of a mobile robot. Therefore, an error of a gyro sensor in estimating the rotation angle of the mobile robot can be corrected in real time. Since a gyro sensor error that may vary over time is corrected in real time, the rotation angle of the mobile robot can be estimated relatively accurately.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

The invention claimed is:

1. An apparatus for calibrating a gyro sensor output, the apparatus comprising:
a state determination unit configured to select from successive gyro sensor outputs a set of sensor outputs whose deviation is equal to or less than a predetermined threshold;
a bias estimation unit configured to estimate a bias value using the selected set of sensor outputs; and
a gyro sensor output calibration unit configured to calibrate a new gyro sensor output using the estimated bias value.

2. The apparatus of claim 1, wherein the state determination unit is further configured to select from the successive gyro sensor outputs a different set of sensor outputs whose deviation is equal to or less than the predetermined threshold, wherein at least one sensor output in the different set of sensor outputs comes after the sensor outputs in the set of sensor outputs in time in the successive gyro sensor outputs.

3. The apparatus of claim 2, wherein the bias estimation unit is further configured to update the bias value with the selected different set of sensor outputs.

4. The apparatus of claim 3, wherein the bias estimation unit is further configured to update the bias value using the following equation:

$$E(k+1) = \frac{k \times E[k]}{k+1} + \frac{v_{k+1}}{k+1},$$

where E(k) is a bias value estimated at time index k, E(k+1) is a bias value estimated at time index k+1, and $V_{k+1}$ is a gyro sensor output at time index k+1.

5. The apparatus of claim 2, wherein each of the selected set of sensor outputs and the selected different set of sensor outputs includes sensor outputs taken from the successive gyro sensor outputs over a predetermined period of time.

6. The apparatus of claim 1, wherein the deviation of the selected set of sensor outputs is a standard deviation or a variance of the selected set of sensor outputs.

7. An apparatus for calibrating a gyro sensor output, the apparatus comprising:
a state determination unit configured to receive successive gyro sensor outputs and search the received successive gyro sensor outputs for a particular set of sensor outputs whose deviation is equal to or less than a predetermined threshold;
a bias estimation unit configured to estimate a bias value using the particular set of sensor outputs upon finding the particular set of sensor outputs; and
a gyro sensor output calibration unit configured to calibrate a new gyro sensor output using the estimated bias value.

8. An apparatus for calibrating a gyro sensor output, the apparatus comprising:
a state determination unit configured to receive successive gyro sensor outputs, search the received successive gyro sensor outputs for a particular set of sensor outputs whose deviation is equal to or less than a predetermined threshold, and provide a stationary state indication signal upon finding the particular set of sensor outputs;
a bias estimation unit configured to estimate a bias value using the particular set of sensor outputs in response to the stationary state indication signal; and
a gyro sensor output calibration unit configured to calibrate a new gyro sensor output using the estimated bias value.

* * * * *